US008636958B2

(12) United States Patent
Salazar-Guillen et al.

(10) Patent No.: US 8,636,958 B2
(45) Date of Patent: Jan. 28, 2014

(54) NOZZLE REACTOR AND METHOD OF USE (75) Inventors: Jose Armando Salazar-Guillen, Reno, NV (US); Mahendra Joshi, Katy, TX (US); Christopher Ard, Catlettsburg, KY (US)

(73) Assignee: Marathon Oil Canada Corporation, Calgary, Alberta (CA)

(*) Notice: Subject to any disclaimer, the term of this patent is extended or adjusted under 35 U.S.C. 154(b) by 53 days.

(21) Appl. No.: 13/227,470

(22) Filed: Sep. 7, 2011

(65) Prior Publication Data

US 2013/0058835 A1    Mar. 7, 2013

(51) Int. Cl.
*B01J 19/00* (2006.01)
*B01J 8/00* (2006.01)
*B01J 8/04* (2006.01)

(52) U.S. Cl.
USPC ............ 422/129; 422/187; 422/600; 422/630

(58) Field of Classification Search
USPC ..................... 422/129, 187, 600, 630; 208/46
See application file for complete search history.

(56) References Cited

U.S. PATENT DOCUMENTS

| | | |
|---|---|---|
| 2,658,861 A | 11/1953 | Pevere et al. |
| 2,871,180 A | 1/1959 | Lowman et al. |
| 3,079,327 A | 2/1963 | Keith et al. |
| 3,131,141 A | 4/1964 | West |
| 3,389,075 A | 6/1968 | Addison |
| 3,527,692 A | 9/1970 | Titus |
| 3,556,409 A * | 1/1971 | Johannisson ............... 137/829 |
| 3,565,593 A | 2/1971 | Moore |
| 3,565,594 A | 2/1971 | Moore et al. |
| 3,565,968 A | 2/1971 | Moore |
| 3,692,859 A | 9/1972 | Cottle |
| 3,779,902 A | 12/1973 | Mitchell et al. |
| 3,951,778 A | 4/1976 | Willard, Sr. |
| 4,035,282 A | 7/1977 | Stuchberry et al. |
| 4,046,668 A | 9/1977 | Farcasiu et al. |
| 4,120,777 A | 10/1978 | Globus |
| 4,139,450 A | 2/1979 | Hanson et al. |
| 4,308,133 A | 12/1981 | Meyer |
| 4,320,091 A | 3/1982 | Irvin |
| RE30,963 E | 6/1982 | Moller et al. |
| 4,347,118 A | 8/1982 | Funk et al. |

(Continued)

FOREIGN PATENT DOCUMENTS

| | | |
|---|---|---|
| CA | 2224615 | 6/1999 |
| JP | 2005307104 | 11/2005 |
| WO | WO 2007/102819 | 9/2007 |

OTHER PUBLICATIONS

International Search Report, PCT/US2012/033013, Oct. 31, 2012 (5 pp.).

(Continued)

*Primary Examiner* — Walter D Griffin
*Assistant Examiner* — Natasha Young
(74) *Attorney, Agent, or Firm* — Jack E. Ebel; Corey S. Tumey; Rodney F. Brown (57) ABSTRACT

A nozzle reactor includes a passage having one or more regions with a converging-diverging shape. The nozzle reactor accelerates a reacting fluid to supersonic velocities and mixes it with a feed material. The reacting fluid and the feed material may be pre-heated. The high speed collision between the reacting fluid and the feed material at elevated temperatures causes the materials to react.

18 Claims, 4 Drawing Sheets

(56) References Cited

U.S. PATENT DOCUMENTS

| | | | |
|---|---|---|---|
| 4,427,537 A | 1/1984 | Dean et al. | |
| 4,490,259 A | 12/1984 | Coffing | |
| 4,589,980 A | 5/1986 | Keys | |
| 4,596,651 A | 6/1986 | Wolff et al. | |
| 4,612,113 A | 9/1986 | Kallionen | |
| 4,678,561 A | 7/1987 | Keys | |
| 4,678,562 A | 7/1987 | Keys | |
| 4,724,272 A | 2/1988 | Raniere et al. | |
| 4,744,890 A | 5/1988 | Miller et al. | |
| 4,859,317 A | 8/1989 | Shelfantook et al. | |
| 4,900,454 A | 2/1990 | Hedlund et al. | |
| 4,909,914 A * | 3/1990 | Chiba et al. | 204/164 |
| 5,044,552 A | 9/1991 | Becker et al. | |
| 5,108,583 A | 4/1992 | Keon | |
| 5,143,598 A | 9/1992 | Graham et al. | |
| 5,176,802 A | 1/1993 | Duyvesteyn et al. | |
| 5,188,805 A | 2/1993 | Sabottke | |
| 5,223,148 A | 6/1993 | Tipman et al. | |
| 5,236,577 A | 8/1993 | Tipman et al. | |
| 5,254,325 A | 10/1993 | Yamasaki et al. | |
| 5,328,591 A | 7/1994 | Raterman | |
| 5,356,075 A | 10/1994 | Heide et al. | |
| 5,370,310 A | 12/1994 | Willan | |
| 5,389,274 A | 2/1995 | Fernandez | |
| 5,443,158 A | 8/1995 | McKenny et al. | |
| 5,464,503 A | 11/1995 | Avetisian et al. | |
| 5,485,883 A | 1/1996 | Rippetoe et al. | |
| 5,538,081 A | 7/1996 | Rippetoe et al. | |
| 5,554,301 A | 9/1996 | Rippetoe et al. | |
| 5,565,090 A | 10/1996 | Gosling et al. | |
| 5,624,642 A | 4/1997 | Devanathan et al. | |
| 5,626,743 A | 5/1997 | Humphreys | |
| 5,670,056 A | 9/1997 | Yoon et al. | |
| 5,673,859 A | 10/1997 | Haruch | |
| 5,702,612 A | 12/1997 | Wang | |
| 5,705,722 A | 1/1998 | Monnier et al. | |
| 5,795,466 A | 8/1998 | Kelebek et al. | |
| 5,798,137 A | 8/1998 | Lord et al. | |
| 5,849,201 A | 12/1998 | Bradley | |
| 5,876,592 A | 3/1999 | Tipman et al. | |
| 5,896,435 A | 4/1999 | Gautier et al. | |
| 5,961,786 A | 10/1999 | Freel et al. | |
| 5,968,349 A | 10/1999 | Duyvesteyn et al. | |
| 6,007,709 A | 12/1999 | Duyvesteyn et al. | |
| 6,036,849 A | 3/2000 | Rippetoe | |
| 6,042,717 A | 3/2000 | Radcliffe et al. | |
| 6,074,558 A | 6/2000 | Duyvesteyn et al. | |
| 6,106,787 A | 8/2000 | Rippetoe | |
| 6,214,213 B1 | 4/2001 | Tipman et al. | |
| 6,320,148 B1 | 11/2001 | Yoon et al. | |
| 6,352,639 B2 | 3/2002 | Ito et al. | |
| 6,427,843 B1 | 8/2002 | Clark | |
| 6,514,310 B2 | 2/2003 | Allemand et al. | |
| 6,589,417 B2 | 7/2003 | Taciuk et al. | |
| 6,595,163 B2 | 7/2003 | Dumaz et al. | |
| 6,659,375 B1 | 12/2003 | Mudge et al. | |
| 6,667,348 B2 | 12/2003 | Chang et al. | |
| 6,793,079 B2 | 9/2004 | Khan et al. | |
| 6,821,500 B2 | 11/2004 | Fincke | |
| 6,827,786 B2 | 12/2004 | Lord | |
| 6,835,360 B2 | 12/2004 | Warren | |
| 6,855,838 B2 | 2/2005 | Haas et al. | |
| 6,871,743 B2 | 3/2005 | Yoon et al. | |
| 6,887,283 B1 | 5/2005 | Ginosar et al. | |
| 6,906,164 B2 | 6/2005 | DeBruin | |
| 6,916,964 B2 | 7/2005 | Gobbel et al. | |
| 6,936,227 B1 | 8/2005 | De Souza et al. | |
| 6,989,091 B2 | 1/2006 | Jorgensen | |
| 7,008,528 B2 | 3/2006 | Mitchell et al. | |
| 7,011,749 B2 | 3/2006 | Hayes et al. | |
| 7,018,435 B1 | 3/2006 | Wentinck | |
| 7,097,675 B2 | 8/2006 | Detering et al. | |
| 7,195,747 B2 | 3/2007 | Vanden Bussche et al. | |
| 7,381,320 B2 | 6/2008 | Iqbal et al. | |
| 7,384,557 B2 | 6/2008 | Phillips et al. | |
| 7,585,407 B2 | 9/2009 | Duyvesteyn | |
| 7,811,444 B2 | 10/2010 | Duyvesteyn et al. | |
| 7,824,453 B2 | 11/2010 | Duyvesteyn | |
| 7,888,542 B2 | 2/2011 | Koivusalmi et al. | |
| 7,909,989 B2 | 3/2011 | Duyvesteyn et al. | |
| 2005/0070218 A1 | 3/2005 | Phillips et al. | |
| 2007/0170095 A1 | 7/2007 | Freel et al. | |
| 2008/0016972 A1 * | 1/2008 | Mudge et al. | 73/865.9 |
| 2008/0156702 A1 | 7/2008 | Duyvesteyn | |
| 2008/0210602 A1 | 9/2008 | Duyvesteyn | |
| 2008/0242875 A1 | 10/2008 | Hong et al. | |
| 2009/0145809 A1 | 6/2009 | Ledbetter et al. | |
| 2009/0266741 A1 * | 10/2009 | Duyvesteyn et al. | 208/128 |
| 2009/0294332 A1 | 12/2009 | Ryu | |
| 2010/0059411 A1 | 3/2010 | Satchell, Jr. | |
| 2013/0036764 A1 * | 2/2013 | VanOsdol | 62/617 |

OTHER PUBLICATIONS

Hong et al., "A Polar-Nonpolar, Acetic Acid/Heptane, Solvent Medium for Degradation of Pyrene by Ozone," Ind. Eng. Chem. Res. 43:7710-7715, 2004 (6 pp.).

Houdaille, "Jet Pump Technical Data—Pumping Liquids," pp. 1-11, 1982 (12 pp.).

Information about Related Patents and Patent Applications, see the section below having the same title.

International Search Report and Written Opinion, PCT/US2005/34092, Jul. 26, 2007 (6 pp.).

International Search Report and Written Opinion, PCT/US2006/08263, Oct. 23, 2006 (5 pp.).

International Search Report and Written Opinion, PCT/US2005/36728, Aug. 8, 2005 (8 pp.).

International Search Report, PCT/US2010/31260, Jun. 9, 2010 (3 pp.).

International Search Report and Written Opinion, PCT/US2010/42327, Sep. 1, 2010 (9 pp.).

International Search Report, PCT/US2010/043093, Sep. 13, 2010 (3 pp.).

International Search Report, PCT/US2011/057585, May 30, 2012 (3 pp.).

Axelsson, H. et al., Centrifuges, Sedimentation, pp. 1-6, Jul. 15, 2006 (6 pp.).

Schneider, D. et al., Deep Cut Vacuum Tower Incentives for Various Crudes, Stratus Engineering, Inc., pp. 1-21, Mar. 1997 (21 pp.).

International Search Report, PCT/US2011/022206, Oct. 20, 2011 (3 pp.).

* cited by examiner

NOZZLE REACTOR AND METHOD OF USE

INCORPORATION OF RELATED PATENT APPLICATIONS

The entire contents of the following documents are incorporated by reference herein: U.S. Pat. No. 7,618,597, titled "Nozzle Reactor and Method of Use," issued on 17 Nov. 2009 (the '597 patent) and U.S. Pat. No. 7,927,565, titled "Nozzle Reactor and Method of Use," issued on 19 Apr. 2011 (the '565 patent). In the event of a conflict, the subject matter explicitly recited or shown herein controls over any subject matter incorporated by reference.

BACKGROUND

A nozzle reactor is a pipe or tube of varying cross sectional area in which two or more materials interact to alter the properties and/or chemical composition of the materials. The geometry of the nozzle reactor enhances the desired interaction between the two materials to produce the desired output.

In one type of nozzle reactor, the desired interaction is achieved by accelerating one or more of the materials to a high velocity and combining it with another material. The additional kinetic energy imparted to the accelerated material helps facilitate the desired interaction. However, the high velocity and demanding conditions in the reactor make it difficult to combine the materials in a uniform, even manner.

The high velocities and demanding conditions also tend to produce a lot of friction inside the reactor. The friction wears away certain areas in the reactor thereby increasing maintenance and repair costs. In some instances, the amount of wear is high enough to force the user to regularly replace large portions of the reactor.

SUMMARY

A nozzle reactor and a method for using it are disclosed herein. Embodiments disclosed below are not intended to be limiting in any way. Instead, the present disclosure is directed toward novel and nonobvious features, aspects, and equivalents of the embodiments and methods described below. The disclosed features and aspects of the embodiments can be used alone or in various novel and nonobvious combinations and sub-combinations of aspects of one another.

In one embodiment, the nozzle reactor includes a passage having a converging-diverging shape that accelerates a reacting fluid. The reacting fluid is combined and reacted with a feed material to produce a variety of desirable products. The kinetic energy along with any thermal energy present in the materials can produce desirable reactions.

In some embodiments, the nozzle reactor includes a main passage through which the reacting fluid passes. The main passage includes a region having a converging-diverging shape that accelerates the reacting fluid to at least Mach 1. The nozzle reactor also includes a feed passage that intersects the main passage after the reacting fluid has passed through the converging-diverging region of the main passage. Feed material travels through the feed passage to the main passage where it contacts and reacts with the reacting fluid.

The nozzle reactor can include a distributor, and in some embodiments the distributor uniformly distributes the feed material through an annular cavity and into contact with the reacting fluid. In some embodiments, the distributor can prevent the feed material from flowing toward the reacting fluid in an uneven manner—e.g., more of the feed material reaches the reacting fluid on the side closest to the incoming feed passage then on the other side. In some embodiments, the distributor can be a physically separate component that is removable and replaceable.

In some embodiments, the flow of feed material toward the main passage and the reacting fluid is uniform and even. In certain embodiments, the flow may form an annulus as it flows from the distributor toward the main passage. In some embodiments, the flow rate and/or velocity of the feed material can vary less than 10% along a given circumference of the annulus thereby preventing uneven injection of the feed material into the main passage.

In some embodiments, the distributor includes a wear ring that is removable and replaceable. The main passage can pass through the wear ring and the feed passage can meet the main passage immediately upstream of the wear ring. In certain embodiments, the wear ring is the first structure the reacting fluid and the feed material encounter after mixing. This is a location in the nozzle reactor that can be subject to substantial wear and erosion due to the collision of the reacting fluid and the feed material in this area.

In some embodiments, the nozzle reactor can include a head portion and a body portion coupled together. The head portion and the body portion can be separated to provide access to the distributor and the wear ring. This allows the operator to remove the head portion and replace the distributor and/or wear ring when they wear out. Although the wear ring may be securely coupled to the distributor, it can still be a physically separate component having readily defined boundaries that allow it to be identified, removed, and replaced.

In some embodiments, the nozzle reactor includes two or more regions having a converging-diverging shape positioned in series. The first region accelerates the reacting fluid before it impacts the feed material. The feed material can then be mixed with the reacting fluid. The resulting mixture passes through the second converging-diverging region. The second region is larger than the first region to provide adequate mixing and residence time to drive the reaction forward. The second region allows a portion of the mixture near the outside edge to flow backward thereby creating an eddy of sorts inside the second region.

In some embodiments, the nozzle reactor may be used to crack heavy hydrocarbon material into distillates. The reacting fluid or cracking fluid can be steam, natural gas, or other suitable fluid. In certain embodiments, the reacting fluid is accelerated to at least Mach 1 and mixed with the heavy hydrocarbon material to initiate cracking. The temperature and/or kinetic energy of the reacting fluid and the heavy hydrocarbon material are sufficient to convert a substantial amount of it to distillates. The reacting fluid functions as a hydrogen source thereby minimizing coke formation due to excessive hydrogen loss from the heavy hydrocarbon material.

In some embodiments, the nozzle reactor can be used as part of a method for cracking heavy hydrocarbon material and forming distillates. The method may include reacting the heavy hydrocarbon material with a reacting fluid such as steam or natural gas in the nozzle reactor to produce distillates. In certain embodiments, the effluent from the nozzle reactor may be separated to isolate any remaining heavy hydrocarbon material and recycled back through the nozzle reactor until it is mostly or completely eliminated. The recycled heavy hydrocarbon material does not produce significant amounts of coke due to the hydrogen rich environment supplied by the reacting fluid. The entire process may be operated without the use of a catalyst or added hydrogen.

The term "heavy hydrocarbon material" is used to refer to the hydrocarbon fraction that has a boiling point at or above 525° C. This material may be obtained from a number of sources such as the residue from distillation operations such as atmospheric or vacuum distillation, the residue from hydroskimming operations, natural sources such as tar sands (including oil sands and oil shale), and even certain high viscosity crude oils. The term "distillates" is used to refer to the hydrocarbon fraction that has a boiling point below 525° C.

The foregoing and other features, utilities, and advantages of the subject matter described herein will be apparent from the following more particular description of certain embodiments as illustrated in the accompanying drawings. In this regard, it is be understood that the scope of the invention is to be determined by the claims as issued and not by whether any given subject matter includes any or all features or aspects noted in this Summary or addresses any issues noted in the Background.

DRAWINGS

The preferred and other embodiments are disclosed in association with the accompanying drawings in which.

DETAILED DESCRIPTION

An improved nozzle reactor is described herein. Although the nozzle reactor is described primarily in the context of upgrading heavy hydrocarbon materials, it should be appreciated that the referenced structure, concepts, and features may be used in a variety of other settings that would be recognized by those of ordinary skill in the art. Also, it should be understood, that the features, advantages, characteristics, etc. of one embodiment may be applied to any other embodiment to form an additional embodiment unless noted otherwise.

A nozzle reactor can be any type of apparatus or device having a convergent and/or divergent internal shape in which one or more materials are injected for the purpose of chemically and/or mechanically interacting with each other. The internal shape increases the kinetic energy of the one or more materials to facilitate the desired interaction.

Figure 1:
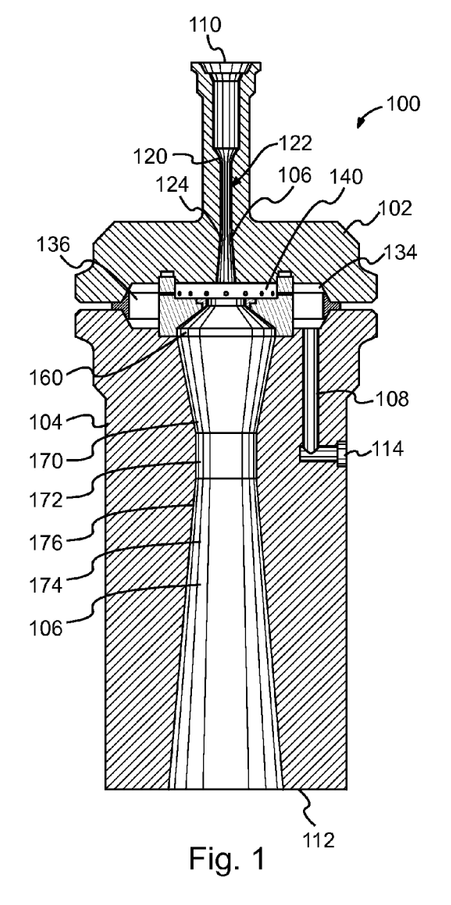
FIG. 1 shows a cross-sectional view of one embodiment of a nozzle reactor.
Figure 2:
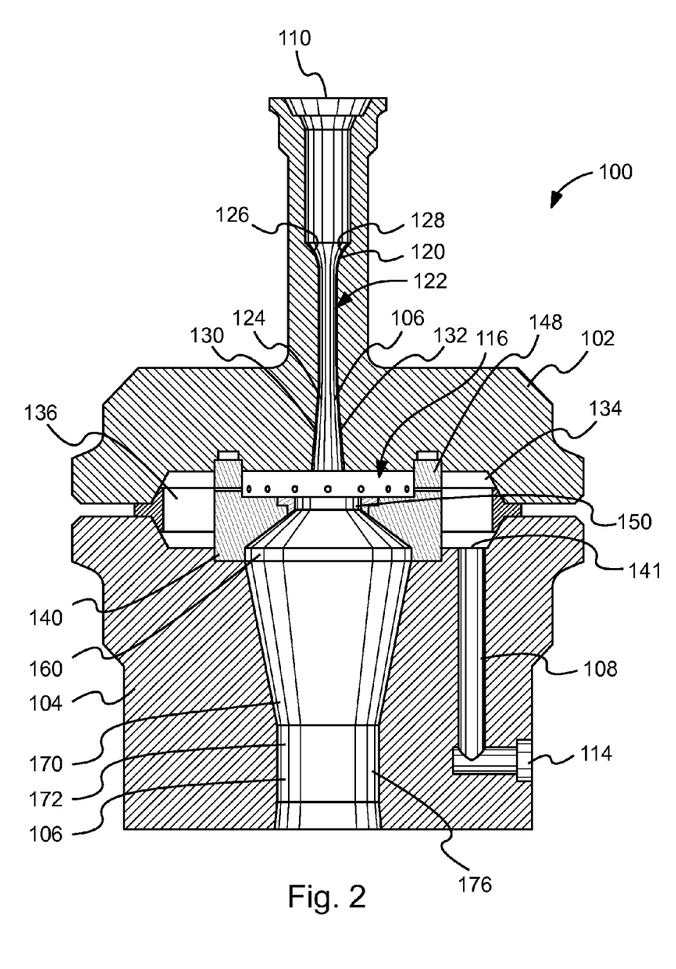
FIG. 2 shows a cross-sectional view of the top portion of the nozzle reactor shown in FIG. 1.

FIGS. 1 and 2 show cross-sectional views of one embodiment of a nozzle reactor 100. The nozzle reactor 100 includes a head portion 102 coupled to a body portion 104. A main passage 106 extends through both the head portion 102 and the body portion 104. The head and body portions 102, 104 are coupled together so that the central axes of the main passage 106 in each portion 102, 104 are coaxial so that the main passage 106 extends straight through the nozzle reactor 100.

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The nozzle reactor 100 includes a feed passage 108 that is in fluid communication with the main passage 106. The feed passage 108 intersects the main passage 106 at a location between the portions 102, 104. The main passage 106 includes an entry opening 110 at the top of the head portion 102 and an exit opening 112 at the bottom of the body portion 104. The feed passage 108 also includes an entry opening 114 on the side of the body portion 104 and an exit opening 116 that is located where the feed passage 108 meets the main passage 106.

During operation, the nozzle reactor 100 includes a reacting fluid that flows through the main passage 106. The reacting fluid enters through the entry opening 110, travels the length of the main passage 106, and exits the nozzle reactor 100 out of the exit opening 112. A feed material flows through the feed passage 108. The feed material enters through the entry opening 114, travels through the feed passage 106, and exits into the main passage 108 at exit opening 116.

The main passage 106 is shaped to accelerate the reacting fluid. The main passage 106 may have any suitable geometry that is capable of doing this. As shown in FIGS. 1 and 2, the main passage 106 includes a first region having a convergent section 120 (also referred to herein as a contraction section), a throat 122, and a divergent section 124 (also referred to herein as an expansion section). The first region is in the head portion 102 of the nozzle reactor 100.

The convergent section 120 is where the main passage 106 narrows from a wide diameter to a smaller diameter, and the divergent section 124 is where the main passage 106 expands from a smaller diameter to a larger diameter. The throat 122 is the narrowest point of the main passage 106 between the convergent section 120 and the divergent section 124. When viewed from the side, the main passage 106 appears to be pinched in the middle, making a carefully balanced, asymmetric hourglass-like shape. This configuration is commonly referred to as a convergent-divergent nozzle or "con-di nozzle".

The convergent section of the main passage 106 accelerates subsonic fluids since the mass flow rate is constant and the material must accelerate to pass through the smaller opening. The flow will reach sonic velocity or Mach 1 at the throat 122 provided that the pressure ratio is high enough. In this situation, the main passage 106 is said to be in a choked flow condition.

Increasing the pressure ratio further does not increase the Mach number at the throat 122 beyond unity. However, the flow downstream from the throat 122 is free to expand and can reach supersonic velocities. It should be noted that Mach 1 can be a very high speed for a hot fluid since the speed of sound varies as the square root of absolute temperature. Thus the speed reached at the throat 122 can be far higher than the speed of sound at sea level.

The divergent section 124 of the main passage 106 slows subsonic fluids, but accelerates sonic or supersonic fluids. A convergent-divergent geometry can therefore accelerate fluids in a choked flow condition to supersonic speeds. The convergent-divergent geometry can be used to accelerate the hot, pressurized reacting fluid to supersonic speeds, and upon expansion, to shape the exhaust flow so that the heat energy propelling the flow is maximally converted into kinetic energy.

The flow rate of the reacting fluid through the convergent-divergent nozzle is isentropic (fluid entropy is nearly constant). At subsonic flow the fluid is compressible so that sound, a small pressure wave, can propagate through it. At the throat 122, where the cross sectional area is a minimum, the fluid velocity locally becomes sonic (Mach number=1.0). As the cross sectional area increases the gas begins to expand and the gas flow increases to supersonic velocities where a sound wave cannot propagate backwards through the fluid as viewed in the frame of reference of the nozzle (Mach number>1.0).

The main passage 106 only reaches a choked flow condition at the throat 122 if the pressure and mass flow rate is sufficient to reach sonic speeds, otherwise supersonic flow is not achieved and the main passage will act as a venturi tube. In order to achieve supersonic flow, the entry pressure to the nozzle reactor 100 should be significantly above ambient pressure.

The pressure of the fluid at the exit of the divergent section 124 of the main passage 106 can be low, but should not be too low. The exit pressure can be significantly below ambient pressure since pressure cannot travel upstream through the supersonic flow. However, if the pressure is too far below ambient, then the flow will cease to be supersonic or the flow will separate within the divergent section 124 of the main passage 106 forming an unstable jet that "flops" around and damages the main passage 106. In one embodiment, the ambient pressure is no higher than approximately 2-3 times the pressure in the supersonic gas at the exit.

The supersonic reacting fluid collides and mixes with the feed material in the nozzle reactor 100 to produce the desired reaction. The high speeds involved and the resulting collision produces a significant amount of kinetic energy that helps facilitate the desired reaction. The reacting fluid and/or the feed material may also be pre-heated to provide additional thermal energy to react the materials.

The nozzle reactor 100 may be configured to accelerate the reacting fluid to at least approximately Mach 1, at least approximately Mach 1.5, or, desirably, at least approximately Mach 2. The nozzle reactor may also be configured to accelerate the reacting fluid to approximately Mach 1 to approximately Mach 7, approximately Mach 1.5 to approximately Mach 6, or, desirably, approximately Mach 2 to approximately Mach 5.

As shown in FIG. 2, the main passage 106 has a circular cross-section and opposing converging side walls 126, 128. The side walls 126, 128 curve inwardly toward the central axis of the main passage 106. The side walls 126, 128 form the convergent section 120 of the main passage 106 and accelerate the reacting fluid as described above.

The main passage 106 also includes opposing diverging side walls 130, 132. The side walls 130, 132 curve outwardly (when viewed in the direction of flow) away from the central axis of the main passage 106. The side walls 130, 132 form the divergent section 124 of the main passage 106 that allows the sonic fluid to expand and reach supersonic velocities.

The side walls 126, 128, 130, 132 of the main passage 106 provide uniform axial acceleration of the reacting fluid with minimal radial acceleration. The side walls 126, 128, 130, 132 may also have a smooth surface or finish with an absence of sharp edges that may disrupt the flow. The configuration of the side walls 126, 128, 130, 132 renders the main passage 106 substantially isentropic.

The feed passage 108 extends from the exterior of the body portion 104 to an annular chamber 134 formed by head and body portions 102, 104. The portions 102, 104 each have an opposing cavity so that when they are coupled together the cavities combine to form the annular chamber 134. A seal 136 is positioned along the outer circumference of the annular chamber 134 to prevent the feed material from leaking through the space between the head and body portions 102, 104.

It should be appreciated that the head and body portions 102, 104 may be coupled together in any suitable manner. Regardless of the method or devices used, the head and body portions 102, 104 should be coupled together in a way that prevents the feed material from leaking and withstands the forces generated in the interior. In one embodiment, the portions 102, 104 are coupled together using bolts that extend through holes in the outer flanges of the portions 102, 104.

The nozzle reactor 100 includes a distributor 140 positioned between the head and body portions 102, 104. The distributor 140 prevents the feed material from flowing directly from the opening 141 of the feed passage 108 to the main passage 106. Instead, the distributor 140 annularly and uniformly distributes the feed material into contact with the reacting fluid flowing in the main passage 106.

Figure 4:
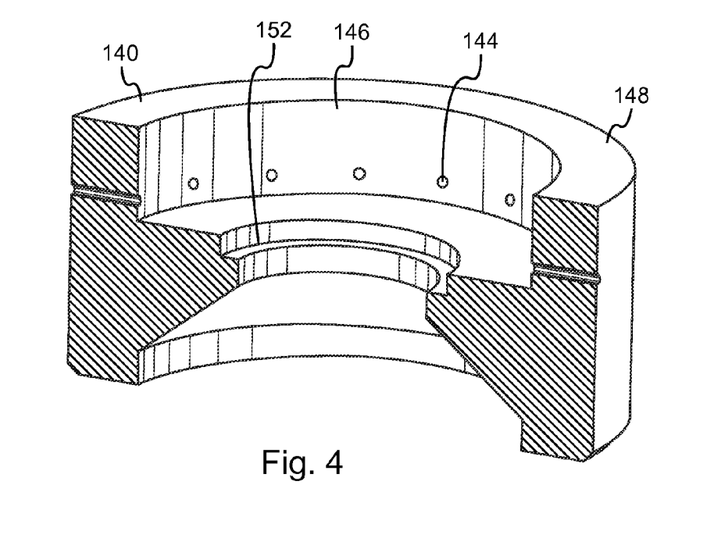
FIG. 4 shows a cross-sectional perspective view of the distributor from the nozzle reactor shown in FIG. 1.

As shown in FIG. 4, the distributor 140 includes an outer circular wall 148 that extends between the head and body portions 102, 104 and forms the inner boundary of the annular chamber 134. A seal or gasket may be provided at the interface between the distributor 140 and the head and body portions 102, 104 to prevent feed material from leaking around the edges.

The distributor 140 includes a plurality of holes 144 that extend through the outer wall 148 and into an interior chamber 146. The holes 144 are evenly spaced around the outside of the distributor 140 to provide even flow into the interior chamber 146. The interior chamber 146 is where the main passage 106 and the feed passage 108 meet and the feed material comes into contact with the supersonic reacting fluid.

The distributor 140 is thus configured to inject the feed material at about a 90° angle to the axis of travel of the reacting fluid in the main passage 106 around the entire circumference of the reacting fluid. The feed material thus forms an annulus of flow that extends toward the main passage 106. The number and size of the holes 144 are selected to provide a pressure drop across the distributor 140 that ensures that the flow through each hole 144 is approximately the same. In one embodiment, the pressure drop across the distributor is at least approximately 2000 pascals, at least approximately 3000 pascals, or at least approximately 5000 pascals.

Figure 5:
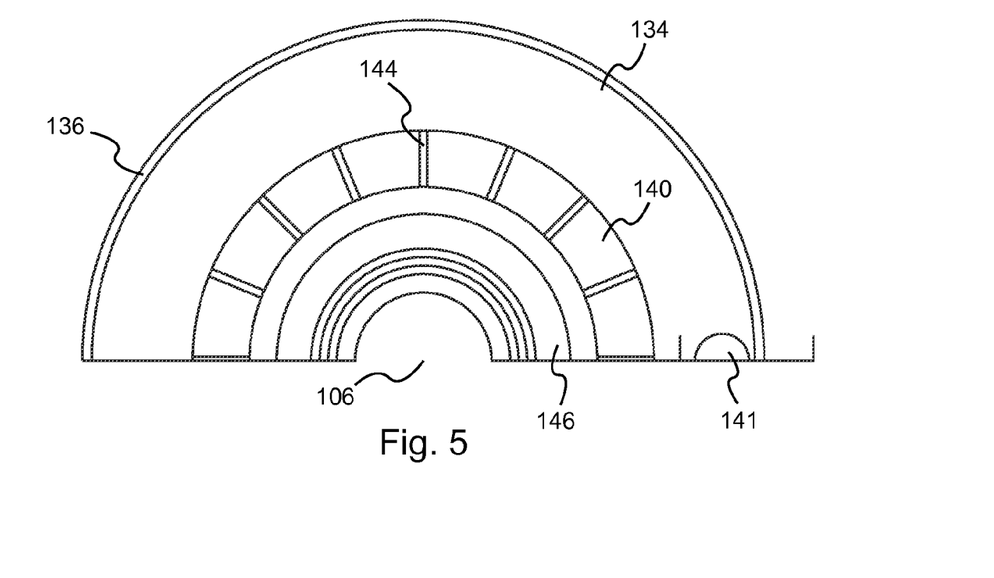
FIG. 5 shows a cross-sectional top view of the distributor from the nozzle reactor shown in FIG. 1.
Figure 6:
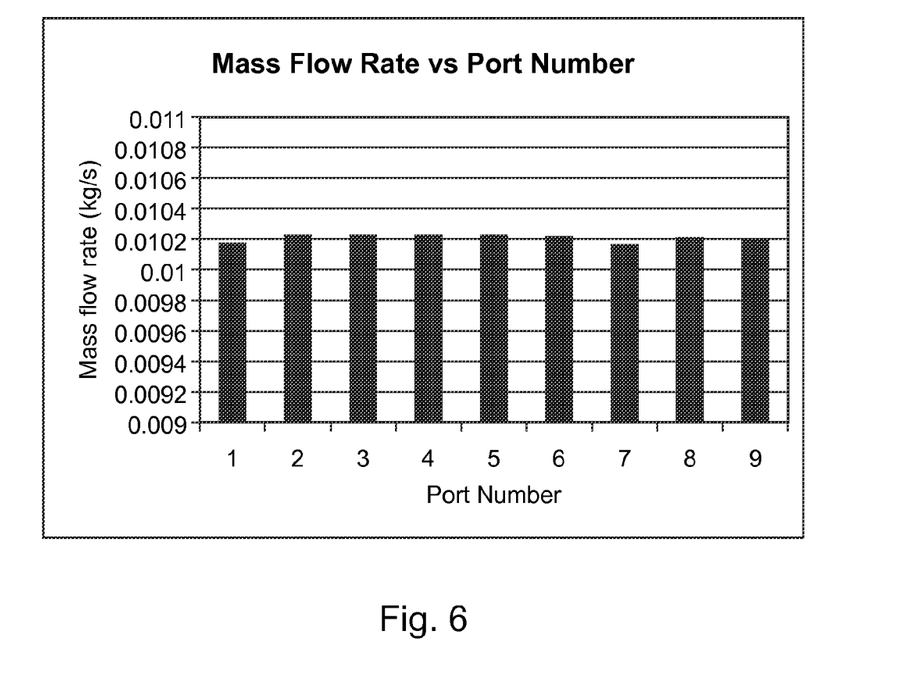
FIG. 6 shows a chart of the mass flow rate through each hole in the distributor shown in FIG. 5.

Turning to FIGS. 5 and 6, the flow rate of the feed material through each hole 144 is calculated using a computer model. FIG. 5 shows the position of the holes 144 relative to the opening 141. The flow rate is calculated for half of the holes 144 since the flow rates of the other half are a mirror image of the calculated flow rates. The flow rate through the holes 144 that are cut in half (holes 1 and 9) is doubled.

FIG. 6 shows a chart of the mass flow rate through each hole 144. As shown in FIG. 6, the flow rate through each hole 144 is approximately the same. In one embodiment, the flow rate through the holes 144 varies less than approximately 10% or, desirably, less than approximately 5%. The same is true for the variation in the flow rate along the circumference of the annulus formed by the flow of feed material towards the main passage 106.

The distributor 140 includes a wear ring 150 positioned immediately adjacent to and downstream of the location where the feed passage 108 meets the main passage 106. The collision of the reacting fluid and the feed material causes a lot of wear in this area. The wear ring is a physically separate component that is capable of being periodically removed and replaced.

Figure 3:
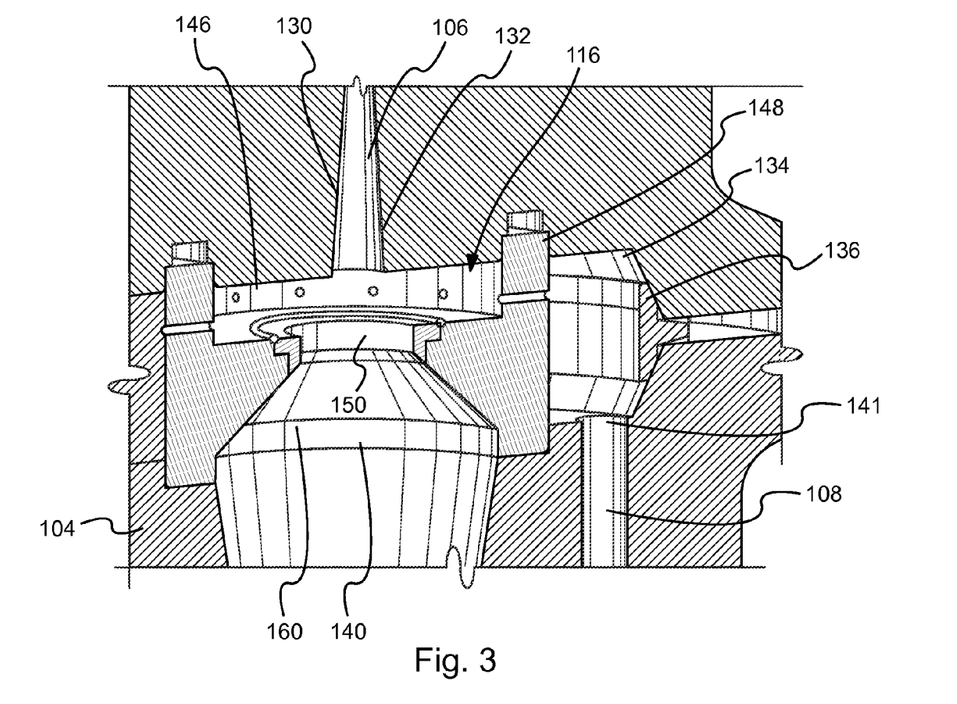
FIG. 3 shows a cross-sectional perspective view of the mixing chamber in the nozzle reactor shown in FIG. 1.

As shown in FIG. 4, the distributor 140 includes an annular recess 152 that is sized to receive and support the wear ring 150. The wear ring 150 is coupled to the distributor 140 to prevent it from moving during operation. The wear ring 150 may be coupled to the distributor in any suitable manner. For example, the wear ring 150 may be welded or bolted to the distributor 140. If the wear ring 150 is welded to the distributor 140, as shown in FIG. 3, the wear ring 150 can be removed by grinding the weld off. In some embodiments, the weld or bolt need not protrude upward into the interior chamber 146 to a significant degree.

The wear ring 150 can be removed by separating the head portion 102 from the body portion 104. With the head portion 102 removed, the distributor 140 and/or the wear ring 150 are readily accessible. The user can remove and/or replace the wear ring 150 or the entire distributor 140, if necessary.

As shown in FIGS. 1 and 2, the main passage 106 expands after passing through the wear ring 150. This can be referred to as expansion area 160 (also referred to herein as an expansion chamber). The expansion area 160 is formed largely by the distributor 140, but can also be formed by the body portion 104.

Following the expansion area 160, the main passage 106 includes a second region having a converging-diverging shape. The second region is in the body portion 104 of the nozzle reactor 100. In this region, the main passage includes a convergent section 170 (also referred to herein as a contraction section), a throat 172, and a divergent section 174 (also referred to herein as an expansion section). The converging-diverging shape of the second region differs from that of the first region in that it is much larger. In one embodiment, the throat 172 is at least 2-5 times as large as the throat 122.

The second region provides additional mixing and residence time to react the reacting fluid and the feed material. The main passage 106 is configured to allow a portion of the reaction mixture to flow backward from the exit opening 112 along the outer wall 176 to the expansion area 160. The backflow then mixes with the stream of material exiting the distributor 140. This mixing action also helps drive the reaction to completion.

The dimensions of the nozzle reactor 100 can vary based on the amount of material that is fed through it. For example, at a flow rate of approximately 590 kg/hr, the distributor 140 can include sixteen holes 144 that are 3 mm in diameter. The dimensions of the various components of the nozzle reactor shown in FIGS. 1 and 2 are not limited, and may generally be adjusted based on the amount of feed flow rate if desired. Table 1 provides exemplary dimensions for the various components of the nozzle reactor 100 based on a hydrocarbon feed input measured in barrels per day (BPD).

TABLE 1

Exemplary nozzle reactor specifications

| Nozzle Reactor Component (mm) | Feed Input (BPD) | | |
|---|---|---|---|
| | 5,000 | 10,000 | 20,000 |
| Main passage, first region, entry opening diameter | 254 | 359 | 508 |
| Main passage, first region, throat diameter | 75 | 106 | 150 |
| Main passage, first region, exit opening diameter | 101 | 143 | 202 |
| Main passage, first region, length | 1129 | 1290 | 1612 |
| Wear ring internal diameter | 414 | 585 | 828 |
| Main passage, second region, entry opening diameter | 308 | 436 | 616 |
| Main passage, second region, throat diameter | 475 | 672 | 950 |
| Main passage, second region, exit opening diameter | 949 | 1336 | 1898 |
| Nozzle reactor, body portion, outside diameter | 1300 | 1830 | 2600 |
| Nozzle reactor, overall length | 7000 | 8000 | 10000 |

It should be appreciated that the nozzle reactor 100 can be configured in a variety of ways that are different than the specific design shown in the Figures. For example, the location of the openings 110, 112, 114, 116 may be placed in any of a number of different locations. Also, the nozzle reactor 100 may be made as an integral unit instead of comprising two or more portions 102, 104. Numerous other changes may be made to the nozzle reactor 100.

Figures 7, 8:
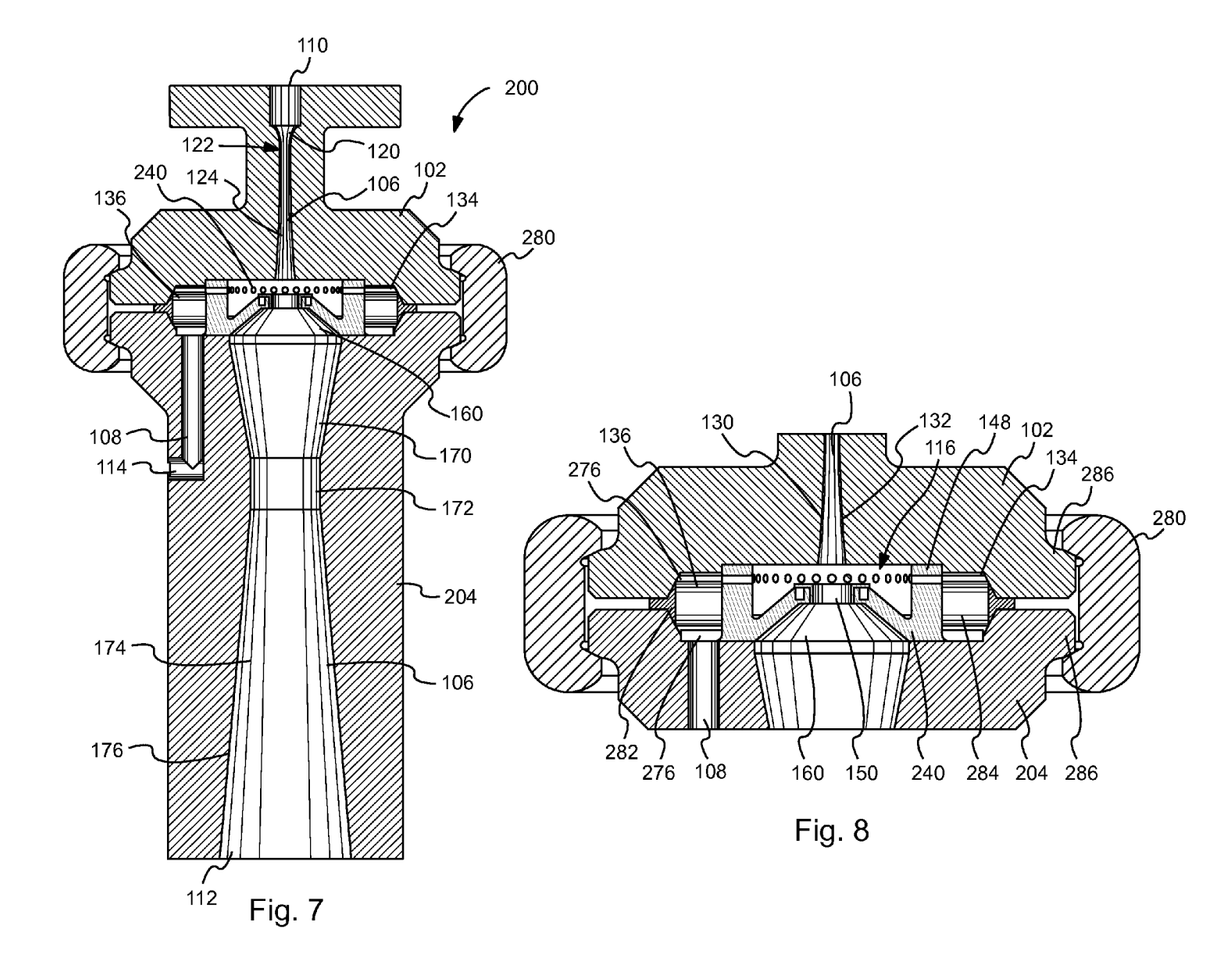
FIG. 7 shows a cross-sectional view of another embodiment of a nozzle reactor.
FIG. 8 shows a cross-sectional view of the top portion of the nozzle reactor shown in FIG. 7.

Turning to FIGS. 7 and 8, another embodiment of a nozzle reactor 200 is shown. This embodiment is similar in many ways to the nozzle reactor 100. Similar components are designated using the same reference number used to illustrate the nozzle reactor 100. The previous discussion of these components applies equally to the similar or same components includes as part of the nozzle reactor 200.

The nozzle reactor 200 differs a few ways from the nozzle reactor 100. The nozzle reactor 200 includes a distributor 240 that is formed as an integral part of the body portion 204. However, the wear ring 150 is still a physically separate component that can be removed and replaced. Also, the wear ring 150 depicted in FIG. 8 is coupled to the distributor 240 using bolts instead of by welding. It should be noted that the bolts are recessed in the top surface of the wear ring 150 to prevent them from interfering with the flow of the feed material.

In FIGS. 7 and 8, the head portion 102 and the body portion 104 are coupled together with a clamp 280. The seal, which can be metal or plastic, resembles a "T" shaped cross-section. The leg 282 of the "T" forms a rib that is held by the opposing faces of the head and body portions 102, 104. The two arms or lips 284 form seals that create an area of sealing surface with the inner surfaces 276 of the portions 102, 104. Internal pressure works to reinforce the seal.

The clamp 280 fits over outer flanges 286 of the head and body portions 102, 104. As the portions 102, 104 are drawn together by the clamp, the seal lips deflect against the inner surfaces 276 of the portions 102, 104. This deflection elastically loads the lips 284 against the inner surfaces 276 forming a self-energized seal. In one embodiment, the clamp is made by Grayloc Products, located in Houston, Tex.

The nozzle reactor 100, 200 can be used to crack heavy hydrocarbon material into distillates. The heavy hydrocarbon material enters the nozzle reactor 100, 200 through the feed passage 108 and a cracking fluid enters through the main passage 106. The heavy hydrocarbon feed material can be fed "raw" into the reactor or can be separated to eliminate or reduce the amount of distillates present in the feed material.

The heavy hydrocarbon material in the feed material can come from a variety of sources. Examples of suitable sources include the residual fraction of distillation operations such as atmospheric or vacuum distillation or from the residual fraction of hydroskimming operations. Other sources include natural sources such as oil sands (which includes tar sands, oil shale, etc.) or even certain high viscosity crude oils. The concentration of heavy hydrocarbon material in the feed material varies depending on its source and whether it was processed previously.

The composition of the heavy hydrocarbon material can vary widely, but often includes asphaltenes, resins, aromatic hydrocarbons, and alkanes in varying amounts. Asphaltenes are large polycyclic molecules that are commonly defined as those molecules that are insoluble in n-heptane and soluble in toluene. Resins are also polycyclic but have a lower molecular weight than asphaltenes. Aromatic hydrocarbons are derivatives of benzene, toluene and xylene. The feed material can also include 12 to 25 wt % micro carbon as determined using ASTM D4530-07.

The feed material can include the heavy hydrocarbon material and other lower boiling fractions. In most situations, it is advantageous to separate distillates from the heavy hydrocarbon material so that it is composed entirely or almost entirely of heavy hydrocarbon material when it enters the nozzle reactor 100, 200. Any suitable separation process (e.g., distillation, etc.) may be used to separate the distillates.

In one embodiment, the feed material includes at least approximately 95 wt % heavy hydrocarbon material, at least approximately 98 wt % heavy hydrocarbon material, or, desirably, at least approximately 99 wt % heavy hydrocarbon material. It should be appreciated that in other embodiments, the feed material may include a substantial amount of distillates.

The feed material is preheated before it enters the nozzle reactor 100, 200 to a temperature that is just below the temperature at which cracking occurs. This imparts the maximum amount of energy to the feed material without initiating cracking. In one embodiment, the heavy hydrocarbon material is heated to a temperature that is no more than 400° C. In another embodiment, the heavy hydrocarbon material is heated to at least approximately 350° C. In yet another embodiment, the heavy hydrocarbon material is heated to approximately 350° C. to approximately 400° C.

The cracking fluid can be any material that when combined with the feed material in the reactor 100, 200 cracks the heavy hydrocarbon material and/or serves as a hydrogen donor to the heavy hydrocarbon material. The cracking fluid may be supplied as a superheated fluid. Suitable cracking fluids include steam, natural gas, methanol, ethanol, ethane, propane, other gases, or combinations thereof. In one embodiment, the cracking fluid is superheated steam, natural gas, or a combination of both.

The cracking fluid helps prevent the formation of coke in the nozzle reactor 100, 200 by functioning as a hydrogen donor for the cracking reactions. The hydrogen from the cracking fluid is transferred to the heaviest hydrocarbons thereby preventing them from becoming hydrogen depleted in the extreme conditions of the nozzle reactor 100, 200.

The cracking fluid may be heated and pressurized before it is introduced to the first reactor 102. The heat and pressure provide added energy that is transferred to the heavy hydrocarbon material causing it to crack or scission. The cracking fluid may be provided in an amount and at a temperature sufficient to heat the heavy hydrocarbon material to the desired temperature and initiate the cracking reactions. The amount of heat supplied in the cracking fluid can be determined using a mass and energy balance.

In one embodiment, the cracking fluid is supplied at a temperature of at least approximately 550° C. or at least approximately 600° C. In another embodiment, the cracking fluid is supplied at a temperature of approximately 550° C. to approximately 700° C. or approximately 600° C. to approximately 650° C. In yet another embodiment, the cracking fluid is supplied at a temperature of no more than approximately 700° C.

In one embodiment, the cracking fluid is pressurized to at least approximately 1380 kPa or at least approximately 3100 kPa. In another embodiment, the cracking fluid is pressurized to approximately 1380 kPa to approximately 6200 kPa or approximately 3100 kPa to approximately 5170 kPa. In yet another embodiment, the cracking fluid is pressurized no more than approximately 6200 kPa or no more than approximately 5170° C.

The ratio of cracking fluid to feed material supplied to the nozzle reactor 100, 200 varies depending on a number of factors. In general, it is desirable to minimize the amount of cracking fluid to reduce cost while still successfully cracking the heavy hydrocarbon material. In one embodiment, the ratio of cracking fluid to heavy hydrocarbon material is no more than 2.0 or no more than 1.7. In another embodiment, the ratio of cracking fluid to heavy hydrocarbon material may be approximately 0.5 to approximately 2.0 or approximately 1.0 to approximately 1.7. In yet another embodiment, the ratio of cracking fluid to heavy hydrocarbon material is at least approximately 0.5 or at least approximately 1.0

The cracking produced in the nozzle reactor is influenced by a number of factors such as temperature, residence time, pressure, and impact force. Without wishing to be bound by theory, it appears that the mechanical forces exerted on the heavy hydrocarbon material due to the impact of the cracking fluid are a significant factor in the success of the nozzle reactor 100, 200. The impact force directly cleaves the molecule apart and/or weakens it making it more susceptible to chemical attack.

The feed material, which includes the heavy hydrocarbon material, is injected into the nozzle reactor via the feed passage 108. The feed material may be pretreated prior to entering the nozzle reactor 10 to alter the amount or fraction of heavy hydrocarbon material. The feed material may also be pretreated to alter its other characteristics as well.

In one embodiment, the feed material includes the heavy fraction from a separation unit. For example, a raw feed may be separated using a distillation column and the heavy fraction sent to the nozzle reactor 100, 200. The effluent produced by the nozzle reactor 100, 200 can be added to the raw feed and separated from any remaining heavy hydrocarbon material in the same separation unit used to provide the heavy hydrocarbon material.

The heavy hydrocarbon material and the cracking fluid are simultaneously injected into the nozzle reactor 100, 200 through the feed passage 108 and the main passage 106, respectively. The configuration of the main passage 106 is such that the cracking fluid is accelerated to supersonic speed and enters the interior chamber 146 at supersonic speed. The cracking fluid produces shock waves that facilitate mechanical and chemical scission of the heavy hydrocarbon material. In this manner, the heavy hydrocarbon material is broken down into distillates.

The nozzle reactor's conversion rate of heavy hydrocarbon material into distillates varies depending on the inputs, conditions, and a number of other factors. In one embodiment, the conversion rate of the nozzle reactor 100, 200 is at least approximately 2%, at least approximately 4%, or, desirably, at least approximately 8%. In another embodiment, the conversion rate of the nozzle reactor 100, 200 is approximately 2% to 25%, approximately 4% to 20%, or, desirably, approximately 8% to 16%.

The nozzle reactor 100, 200 cracks the heavy hydrocarbon material to produce lighter, lower molecular weight hydrocarbons. In one embodiment, the heavy hydrocarbon material is broken down into light hydrocarbon liquid distillate. The light hydrocarbon liquid distillate includes hydrocarbons having a molecular weight less than about 300 Daltons. In certain embodiments, about 25% to about 50% of the heavy hydrocarbon material cracked in the system 100 is converted into distillates.

As already mentioned above, one significant advantage of the nozzle reactor 100, 200 is that it produces very little, if any, coke and minimizes the amount of gas generated. This makes it possible to operate the nozzle reactor 100, 200 for long periods of time without cleaning. In one embodiment, the nozzle reactor 100, 200 may be operated indefinitely. Minimizing coke production also means that more of the heavy hydrocarbon material is conserved so that it can be used to produce higher value products than coke.

It should be appreciated that some portion of the heavy hydrocarbon material may pass through the system 100 without being cracked. This material may be referred to as non-participating heavy hydrocarbons or uncracked heavy hydrocarbons, since the nozzle reactor 100, 200 did not act on this material to crack it into lighter hydrocarbons. Heavy hydrocarbon material that is cracked but still qualifies as heavy hydrocarbon material may also be referred to as non-participating heavy hydrocarbons.

The effluent from the nozzle reactor 100, 200 may be transported to a separation unit that separates it into its constituent fractions. The separation unit may be any suitable separator capable of separating the effluent. Examples of suitable separation units include, but are not limited to, atmospheric or vacuum distillation units, gravity separation units, filtration units, and cyclonic separation units.

The non-participating hydrocarbons may be subjected to further processing to upgrade them into more useful material. Various types of processing may be performed on the non-participating hydrocarbon for upgrading the non-participating hydrocarbon. The remaining fractions may be used as end products or be subjected to further processing.

Depending on the situation, it may not be necessary to crack all of the heavy hydrocarbon material in the heavy hydrocarbon material. It may only be necessary to upgrade a portion of the heavy hydrocarbon material to produce stable products such as synthetic crude oil, which can include some amount of heavy hydrocarbon material.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing figures. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A nozzle reactor comprising:
a main passage including a first region followed by a second region, the first region and the second region each including a convergent section, a throat, and a divergent section; and a feed passage in fluid communication with the main passage;

wherein the feed passage meets the main passage between the throat in the first region and the throat in the second region and wherein the main passage expands between the location where the feed passage meets the main passage and the throat in the second region thereby defining an expansion area; and a distributor positioned in the feed passage, the distributor being configured to annularly distribute flow from the feed passage to the main passage.

2. The nozzle reactor of claim 1 wherein the cross-sectional area of the throat in the second region is at least twice as large as the cross sectional area of the throat in the first region.

3. The nozzle reactor of claim 1 comprising a head portion coupled to a body portion, the head portion including the first region and the body portion including the second region.

4. The nozzle reactor of claim 1 wherein the distributor is a physically separate component capable of being removed from the nozzle reactor and replaced.

5. The nozzle reactor of claim 1 wherein the distributor includes a plurality of openings that are part of the feed passage.

6. The nozzle reactor of claim 1 comprising a wear ring through which the main passage passes, the wear ring being positioned immediately adjacent to and downstream of the location where the feed passage meets the main passage, wherein the wear ring is a physically separate component, whereby the wear ring is capable of being removed from the nozzle reactor and replaced.

7. The nozzle reactor of claim 6 comprising a head portion coupled to a body portion, wherein the head portion is separable from the body portion to provide access to the wear ring.

8. A nozzle reactor comprising:
a main passage including a convergent section, a throat, and a divergent section;
a feed passage in fluid communication with the main passage at a location downstream of the throat;
a distributor positioned in the feed passage, the distributor being configured to annularly distribute flow from the feed passage to the main passage; and
a wear ring through which the main passage passes, the wear ring being positioned immediately adjacent to and downstream of the location where the feed passage meets the main passage;

wherein the wear ring is a physically separate component, whereby the wear ring is capable of being removed from the nozzle reactor and replaced;

wherein the main passage expands downstream of the location where the feed passage is in fluid communication with the main passage thereby forming an expansion chamber.

9. The nozzle reactor of claim 8 comprising a head portion coupled to a body portion, the head portion being upstream of the location where the feed passage meets the main passage.

10. The nozzle reactor of claim 9 wherein the head portion is separable from the body portion to provide access to the wear ring.

11. The nozzle reactor of claim 8 wherein the distributor includes the wear ring.

12. The nozzle reactor of claim 8 wherein the distributor is a physically separate component capable of being removed from the nozzle reactor and replaced.

13. A nozzle reactor comprising:
a main passage including a convergent section, a throat, and a divergent section;
a feed passage in fluid communication with the main passage downstream of the throat;
a reacting fluid flowing through the main passage;
a feed material flowing through the feed passage to the main passage;
a distributor that receives the feed material and distributes it annularly and approximately uniformly into contact with the reacting fluid in the main passage; and
an expansion chamber to provide mixing of the feed material and the reacting fluid.

14. The nozzle reactor of claim 13 wherein the feed material includes heavy hydrocarbon material.

15. The nozzle reactor of claim 13 wherein the reacting fluid includes steam and/or natural gas.

16. The nozzle reactor of claim 1 wherein at least a significant portion of the expansion area is formed by the distributor.

17. The nozzle reactor of claim 13 wherein the expansion chamber is formed in the main passage downstream of the distributor.

18. The nozzle reactor of claim 13 wherein at least a significant portion of the expansion chamber is formed by the distributor.

* * * * *